Nov. 7, 1967  N. G. BAXENDALE  3,351,508
METHOD OF JOINING TOGETHER THE ENDS OF A REINFORCED
BELT TO FORM AN ENDLESS BELT
Filed May 14, 1965

Inventor
Norman G. Baxendale
Stevens, Davis, Miller & Mosher
Attorneys

United States Patent Office 3,351,508
Patented Nov. 7, 1967

3,351,508
METHOD OF JOINING TOGETHER THE ENDS OF A REINFORCED BELT TO FORM AN ENDLESS BELT
Norman G. Baxendale, Liverpool, England, assignor to Dunlop Rubber Company Limited, London, England, a company of Great Britain
Filed May 14, 1965, Ser. No. 455,703
Claims priority, application Great Britain, May 26, 1964, 21,619/64
7 Claims. (Cl. 156—159)

ABSTRACT OF THE DISCLOSURE

A method of joining the ends of a segment of a reinforced belt to form an endless belt comprising butting together the ends of the segment, enclosing the ends between the ends of a two-ply fabric and molding the assembly under heat and pressure to form a unified assembly. The two-ply fabric has its plies interconnected along a line to form a fabric having an X-shaped section in a direction transverse to the line of interconnection.

---

Figure 1:
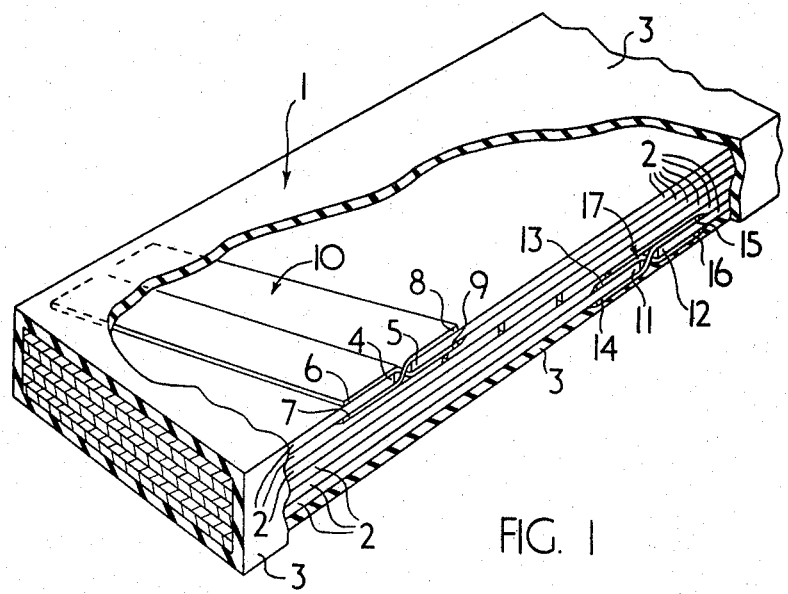

The present invention relates to endless belting and to a method of joining together the ends of a reinforced belt to make an endless belt.

According to the present invention, an endless belt comprises one or more reinforcement plies embedded in a flexible material, the ends of the, or of each, reinforcement ply being butted together and the ends of the reinforcement ply, or the ends of at least the uppermost reinforcement ply, being enclosed between the ends of a two-ply fabric in which fabric the two plies are inter-connected along a line to form a fabric having an X-shaped section in a direction transverse the line of interconnection.

According to the present invention also, a method of joining together the ends of a reinforced belt to form an endless belt comprises butting together the ends of a belt having one or more reinforcement plies embedded in a flexible material, enclosing the ends of the reinforcement ply, or the ends of at least the uppermost reinforcement ply, between the ends of a two-ply fabric in which fabric the two plies are interconnected along a line to form a fabric having an X-shaped section in a direction transverse the line of interconnection, and moulding the assembly so formed under heat and pressure to consolidate the assembly.

The two-ply fabric can be two separate woven plies stitched or otherwise secured together along a line transverse the warp threads or transverse the weft threads, but is preferably a fabric woven so that the warp threads, or the weft threads, of the two plies interchange between the two plies at one point. The two-ply fabric can be made by weaving the two plies simultaneously and causing the warp threads of the two plies to interchange at one point so that the two plies are interconnected along a line transverse the warp threads at any desired angle to the direction of the warp threads. A fabric can be produced having a series of lines of interconnection by interchanging the warp threads between the two plies at predetermined positions, and a two-ply fabric for use in the present invention can be produced by severing this woven fabric between adjacent lines of interconnection.

Alternatively, and preferably, the two-ply fabric is made by weaving the two plies simultaneously and causing the weft threads of the two layers to interchange at one point to produce a fabric in which the two plies are interconnected along a line transverse the weft threads. In this case the two plies are usually interconnected along a line parallel to the warp threads, i.e. at right-angles to the weft threads, and along the longitudinal axis of the fabric. A two-ply fabric for use in the invention can then be prepared by cutting a length of fabric equal to the width of the belt from this woven fabric, and applying the two-ply fabric to the reinforcement ply so that the line of interconnection of the fabric is parallel to the shaped ends of the reinforcement ply. The fabric can be cut at a bias, the angle of bias depending on the angle at which the ends of the reinforcement ply are cut.

The two-ply fabric can be made of any natural or synthetic fibrous or filamentary material, for example fibres made from polyesters, polyamides, rayon, cotton, polyvinyl alcohol, or polypropylene. The two-ply fabric has a covering of a flexible material which will usually be the same as that in which the reinforcement plies are embedded to form the belt. The flexible material can be a natural or synthetic rubber composition or a composition based on polyvinyl chloride.

The reinforcement ply or plies can be made of steel cords or textile cords such as cotton, polyamide or polyester cords. These cords may be disposed parallel to the longitudinal axis of the belt or at an angle to the axis of the belt of up to 40°. Alternatively, the reinforcement plies may comprise a woven textile fabric and usually in this case the warp threads or the weft threads of the woven fabric are disposed parallel to the longitudinal axis of the belt. The fabric can be made of cotton, polyamide, or polyester fibres which can be woven in any suitable weave, e.g. a plain, twill, matt or leno weave. Each reinforcement ply may comprise a multi-ply fabric. The reinforcement plies can be cut to the required length and this may be effected along a line transverse the belt at an angle of 90° with respect to the longitudinal axis of the belt, or at an angle of up to 60° with respect to this line.

The belt comprises one or more reinforcement plies embedded in the flexible material. In the case where the belt has a single reinforcement ply embedded in the flexible material, then the ends of this ply are formed into a butt joint with the two-ply fabric enclosing each end of the reinforcement ply. Where the belt has more than one reinforcement ply, then the reinforcement plies are preferably formed in a stepped arrangement so as to form complementary stepped ends to the belt. In this case, each end of at least the uppermost reinforcement ply and preferably of both outermost reinforcement plies are enclosed by a two-ply fabric, or in the case of a belt having two reinforcement plies, the ends of each reinforcement ply are enclosed by a two-ply fabric. In the case where the reinforcement plies are formed in a stepped arrangement at the ends of the belt, then the two-ply fabric preferably has a length substantially equal to twice the length of a step on the end of the belt, the length of each leg of the two-ply fabric being substantially equal to the length of a step.

Figure 2:
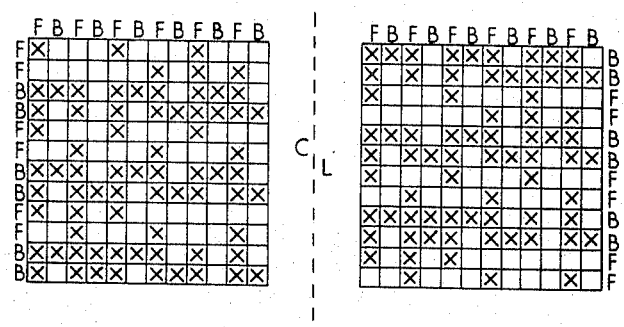

An endless belt constructed in accordance with the present invention and its method of manufacture will now be described by way of example only, with reference to the accompanying drawings, in which:

FIGURE 1 shows a perspective view of a length of reinforced belting in the region of a point between the ends of the reinforcement plies, with the cover layer of flexible material cut away to show the construction of the joint in detail, and FIGURE 2 shows a weaving plan for producing a two-ply fabric in which the two plies are interconnected along a line so that the two-ply fabric has an X-shaped section in a direction transverse the line of interconnection.

Referring to FIGURE 1, an endless belt 1 has six reinforcement plies 2 embedded in a vulcanized rubber composition 3. Each reinforcement ply 2 comprises a woven textile fabric in which the warp and weft threads are made of cotton yarn and nylon yarn doubled together. The reinforcement plies 2 are joined together by means of a splice joint in which the reinforcement plies are in a stepped arrangement, and the ends 4 and 5 of the uppermost reinforcement ply 2 are enclosed by the ends 6, 7, 8 and 9 of a two-ply fabric 10. The ends 11 and 12 of the lower reinforcement ply 2 are similarly enclosed by the ends 13, 14, 15 and 16 of a two-ply fabric 17. The two-ply fabrics 10 and 17 are each made of nylon.

In manufacturing such an endless belt 1, the ends of a belt comprising six reinforcement plies 2 embedded in a flexible material 3 are cut in a direction transverse the belt at an angle of 40° to the longitudinal axis of the belt to produce complementary stepped ends to the belt, the steps all being of substantially the same length. Each reinforcement ply 2 is a woven textile fabric in which the warp and weft threads comprise cotton yarn and nylon yarn doubled together. The stepped ends of the belt are brought together to form a spliced point, and the ends 4 and 5 of the uppermost reinforcement ply 2 are peeled back for a short distance. A two-ply textile fabric 10 having an X-shaped construction is coated with a vulcanizable rubber composition and applied so that the ends 6 and 7 of the two-ply fabric 10 enclose the end 4 of the reinforcement ply 2, and the ends 8 and 9 of the two-ply fabric 10 enclose the end 5 of the reinforcement ply 2.

The ends 11 and 12 of the lowermost reinforcement ply 2 are provided with a two-ply fabric 17 in similar manner, and the assembly so produced is moulded under heat and pressure to consolidate the assembly to produce an endless belt.

FIGURE 2 of the drawings shows a weaving plan suitable for producing a two-ply fabric for use in belting according to the invention. In FIGURE 2, "F" represents warp and weft threads in the uppermost (face) ply of fabric, "B" represents warp and weft threads in the lowermost (back) ply of fabric, and "X" represents a warp thread passing over a weft thread.

The method of the present invention is advantageous in that it enables an endless belt to be produced having a spliced joint which is less liable to failure than spliced joints hitherto produced. In a spliced joint there is a tendnecy during running of the belt for the outermost reinforcement ply to peel back from the underlying plies and for the two ends of the outermost ply to separate. This results eventually in the other reinforcement plies peeling back and/or separating and, thus, in joint failure. In an endless belt made according to the present invention, the outermost reinforcement ply is secured against peeling back and/or separating by the two-ply fabric which encloses the ends of the reinforcement ply, and because of this the joint formed is less liable to failure. Also, the joint produced has increased strength over joints which do not have the two-ply fabric insert.

Having now described my invention, what I claim is:

1. A method of joining together the ends of a reinforced belt to form an endless belt which comprises butting together the ends of a belt having at least one reinforcement ply embedded in a flexible material, enclosing the ends of the reinforcement ply between the ends of a two-ply fabric in which the two plies are interconnected along a line to form a fabric having an X-shaped section in a direction transverse the line of interconnection, and moulding the assembly so formed under heat and pressure to consolidate the assembly.

2. A method according to claim 1 in which the ends of the reinforcement ply are cut at an angle of from 30° to 90° with respect to the longitudinal axis of the belt.

3. A method according to claim 2 in which the angle is from 40° to 90°.

4. A method according to claim 1 in which the belt has more than one reinforcement ply, the ends of said plies being stepped complementary to one another, the ends of one of the outermost reinforcement plies being enclosed between the ends of the two-ply fabric.

5. A method according to claim 4 in which two lengths of two-ply fabric are provided, one for each of the outermost reinforcement plies, the ends of each outermost reinforcement ply being enclosed between the ends of one of the lengths of two-ply fabric.

6. A method according to claim 1 in which said two-ply fabric having an X-shaped section comprises a woven fabric in which the warp threads of the two plies interchange between the two plies at one point to form the line of interconnection.

7. A method according to claim 1 in which said two-ply fabric having an X-shaped section comprises a woven fabric in which the weft threads of the two plies interchange between the two plies at one point to form the line of interconnection.

References Cited

UNITED STATES PATENTS

| | | | |
|---|---|---|---|
| 752,512 | 2/1904 | Buckley | 74—231 |
| 3,249,128 | 5/1966 | Lord | 74—232 XR |
| 2,441,460 | 5/1948 | Walters | 24—38 XR |

EARL M. BERGERT, *Primary Examiner.*

PHILIP DIER, *Examiner.*